Feb. 8, 1955  D. C. BAKEMAN ET AL  2,701,858
VOLTAGE REGULATING SYSTEM
Filed Dec. 1, 1952  2 Sheets-Sheet 2

INVENTOR.
DELBERT C. BAKEMAN,
BY JOHN E. RICHARDSON,

Nicholai T Volen
ATTORNEY.

United States Patent Office 2,701,858
Patented Feb. 8, 1955

2,701,858

VOLTAGE REGULATING SYSTEMS

Delbert C. Bakeman, Palos Verdes, and John E. Richardson, Los Angeles, Calif., assignors, by mesne assignments, to Hughes Aircraft Company, a corporation of Delaware Application December 1, 1952, Serial No. 323,396

13 Claims. (Cl. 321—16)

This invention relates generally to voltage regulating apparatus and, more particularly, to a system for regulating the voltage developed by a direct-current (D. C.) source.

Although voltage regulating systems for D. C. sources are well known, most of them exhibit certain objectionable operating characteristics. For example, one conventional system, usually designated as an electronic system includes a regulator tube connected in series with or across the output circuit of a direct-current source. A system of this type is fast acting but absorbs a large amount of power, resulting in low operating efficiency. Another voltage regulating system utilizes a saturable-core device, such as a magnetic amplifier, to control the amount of current supplied to an alternating-current rectifier circuit. Although this type of system is highly efficient, it is also relatively slow acting, and, therefore, ineffective to eliminate rapid fluctuations of the output voltage developed by the rectifier circuit.

This invention, on the other hand, discloses a voltage regulating system which is both fast acting and highly efficient. In accordance with this invention, an output voltage, developed by a primary D. C. source, is maintained at a predetermined or nominal value by the combined action of an improved electronic type regulator and a conventional regulating device. The improved electronic regulator comprises two regulator tubes and a secondary D. C. source for developing a voltage substantially greater than the nominal value of the primary source output voltage. One of the regulator tubes is connected in series with the secondary source and its associated output circuit, and the other regulator tube is connected across the primary source output circuit. These output circuits are then intercoupled.

In operation, the regulator tubes are made responsive to an error voltage derived from the primary source output circuit and representative of the amount by which the actual primary source output voltage differs from the nominal voltage to be maintained. When the value of the output voltage becomes greater than the nominal value, the anode circuit resistance of the shunt connected regulator tube decreases in response to the error voltage. Consequently, an increased amount of current is drawn from the primary source so that the output voltage decreases. When the value of the output voltage becomes less than the nominal value, the anode circuit resistance of the series connected regulator tube decreases in response to the error voltage. As a result, an increased amount of current is drawn from the secondary source so that the output voltage increases. Thus, each of the regulator tubes is operated selectively according to the sense of a deviation from the nominal output voltage, the series connected tube being effective to raise the actual output voltage and the shunt connected tube being effective to lower it. Of particular significance is the fact that when the actual output voltage equals the nominal output voltage, both tubes are substantially biased to cutoff. Since their anode circuit resistance is then almost infinite, very little power is dissipated in either tube.

High efficiency voltage regulation is obtained by combining a conventional, slow acting, voltage regulating device, such as a magnetic amplifier, with the improved electronic regulator and adapting the latter to operate only during those intervals in which the magnetic amplifier is ineffective, owing to its relatively slow response to rapid voltage fluctuations. This mode of operation is accomplished by suitably differentiating the error voltage impressed on the regulator tubes.

In accordance with another embodiment of the invention, an improved electronic regulator may also be used to advantage without additional regulating means. Whereas a conventional regulator tube circuit dissipates a large amount of power continually, the electronic regulator according to this invention absorbs a significant amount of power only when the voltage to be regulated deviates from a predetermined or nominal value. This is because the anode circuit resistances of the regulator tubes are substantially infinite at all other times.

Therefore, it is an object of this invention to provide a fast acting and highly efficient regulating system for maintaining an output voltage at a predetermined or nominal value.

It is another object to combine an improved electronic voltage regulator with a conventional regulating device in order to obtain fast regulating action with minimum power dissipation.

It is still another object to provide an improved electronic voltage regulator which absorbs a significant amount of power only when the voltage to be regulated differs from the voltage to be maintained.

It is a further object to provide an improved electronic voltage regulator responsive to rapid output voltage fluctuations only.

The novel features which are believed to be characteristic of this invention, both as to its organization and method of operation together with further objects and advantages thereof, will be better understood from the following description considered in connection with the accompanying drawings, in which:

Fig. 3 is a block diagram of an improved electronic voltage regulating system of the present invention; and Fig. 4 is a circuit diagram of an embodiment of the voltage regulating system illustrated in Fig. 3.

Figure 1:
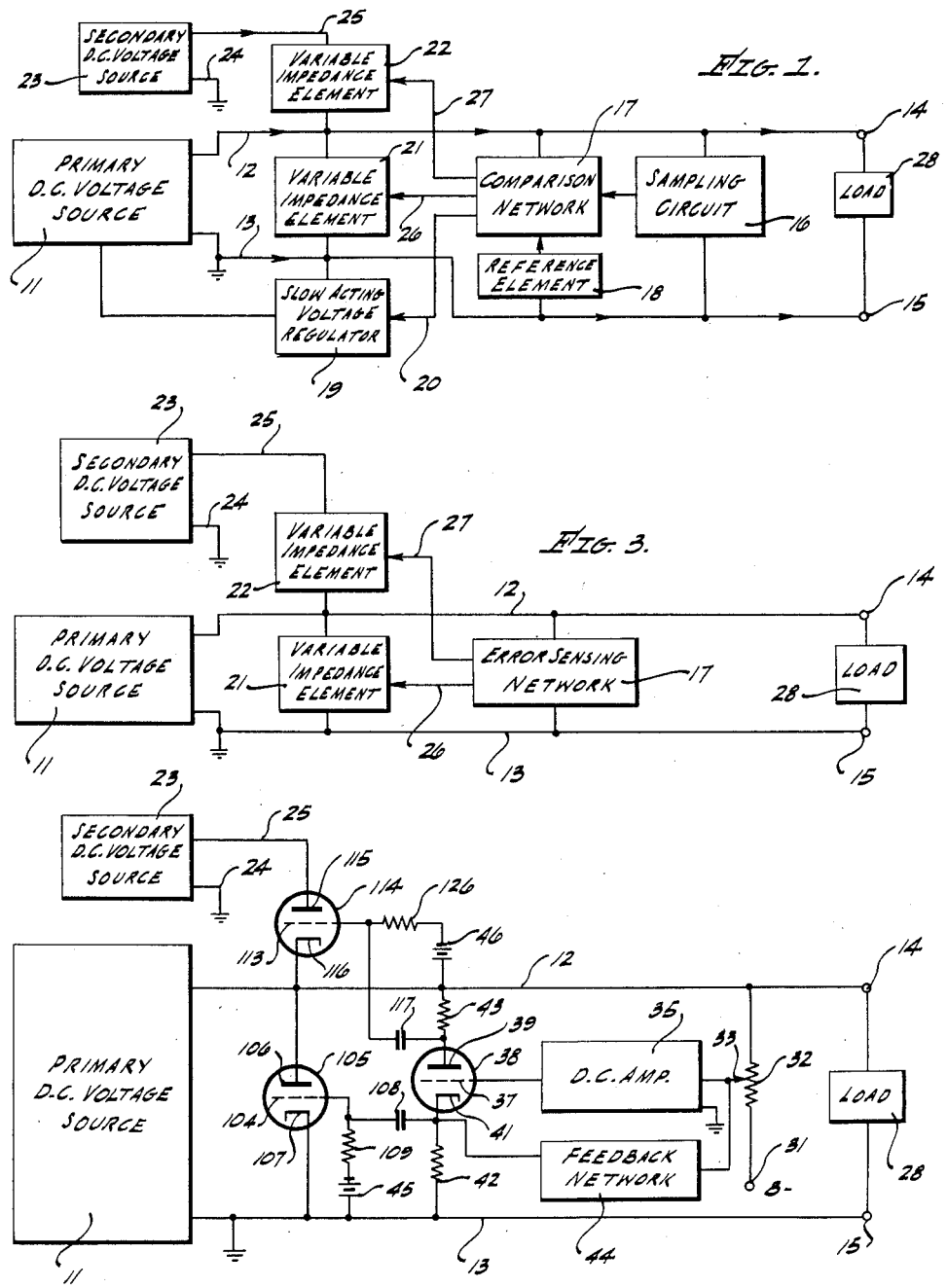
Fig. 1 is a block diagram of a voltage regulating system according to this invention.

Referring to the drawings wherein like elements are designated by the same reference characters and particularly to Fig. 1, there is illustrated a voltage regulating system for maintaining the output voltage developed by a primary D. C. source 11 at a predetermined or nominal value. Primary source 11 is provided with output connections or leads 12 and 13 terminating in output terminals 14 and 15, respectively, across which is connected a load 28. A sampling circuit 16 is connected across output leads 12 and 13 for furnishing a voltage component corresponding to a predetermined portion of the actual output voltage. This voltage component is impressed on a comparison network 17 connected between output leads 12 and 13 through a reference element 18. Comparison network 17 is adapted to generate error voltage components representative of the actual output voltage.

A first of these error voltage components is impressed through a lead 20 on a slow-acting voltage regulator 19 connected to the primary source 11; a second of these error voltage components is impressed through a lead 26 on a variable impedance element 21, connected between output leads 12 and 13; and a third of these error voltage components is impressed through a lead 27 on another variable impedance element 22. Also included in this system is a secondary D. C. source 23, having a first output lead 24 connected to primary source output lead 13, by means of a common junction point, such as ground, and a second output lead 25 connected to primary source output lead 12 through variable impedance element 22. Secondary source 23 is adapted to develop a voltage substantially greater than the nominal voltage to be maintained.

In operation primary source 11 develops an output voltage across output terminals 14, 15 which may deviate from the nominal voltage to be maintained because of a variation in the equivalent resistance of load 28, for example. To compensate for such deviations, a voltage component, corresponding to a predetermined portion of the actual output voltage, is impressed on comparison network 17 by sampling circuit 16, which may comprise a voltage divider, for example. Comparison network 17 is supplied with a stable reference voltage by means of reference element 18, and develops error voltage components, in response to the sample voltage component impressed thereon. A voltage regulator tube of the glow discharge type may be used as the reference element 18. A first of these error voltage components is impressed through lead 20 on voltage regulator 19, a second through lead 26 on variable impedance element 21, and a third through lead 27 on variable impedance element 22.

Regulator 19 comprises a conventional slow acting regulating device, such as a magnetic amplifier or carbon pile, and therefore regulates the primary source output in a highly efficient manner.

However, as is well known, its response to rapid fluctuations of the actual output voltage is relatively slow, so that, in effect, it is inoperative for brief intervals following a sudden change of the output voltage. During these intervals, one or the other of the variable impedance elements 21 and 22, comprising electron discharge devices for example, responds to its associated error voltage component in a manner to regulate the output voltage according to the sense of the deviation from the nominal output voltage. Momentary response of this kind is accomplished by differentiating each of the second and third error voltage components and impressing them on variable impedance elements 21 and 22, respectively, in a reverse phase relation. This may be done in a number of ways well known to those skilled in the art.

If the actual output voltage across terminals 14, 15 becomes greater than the nominal output voltage, the impedance of element 21, which is normally made very high by suitable biasing, momentarily decreases in response to an increase in the value of the second error voltage component. As a result, an increased amount of current is drawn from the primary source 11, so that the actual output voltage decreases. However, as the second error voltage component decays, due to the differentiation thereof, and element 21 again assumes a relatively high impedance, regulator 19 becomes effective to maintain the output voltage of the nominal value. If the actual output voltage becomes less than the nominal voltage, the impedance of element 22 momentarily decreases in similar fashion. The actual output voltage then increases because of the decreased impedance of the connection between the sources 11 and 23 provided by variable impedance element 22 until regulator 19 becomes effective.

Although secondary source 23 is illustrated in Fig. 1 as a separate block or unit, it may be convenient to obtain the voltage developed thereby, directly from an auxiliary circuit included in primary source 11. In this regard it may be noted that, normally, a relatively small amount of average power is furnished by source 23. Similar expedients of this nature will be apparent to those skilled in the art.

Figure 2:
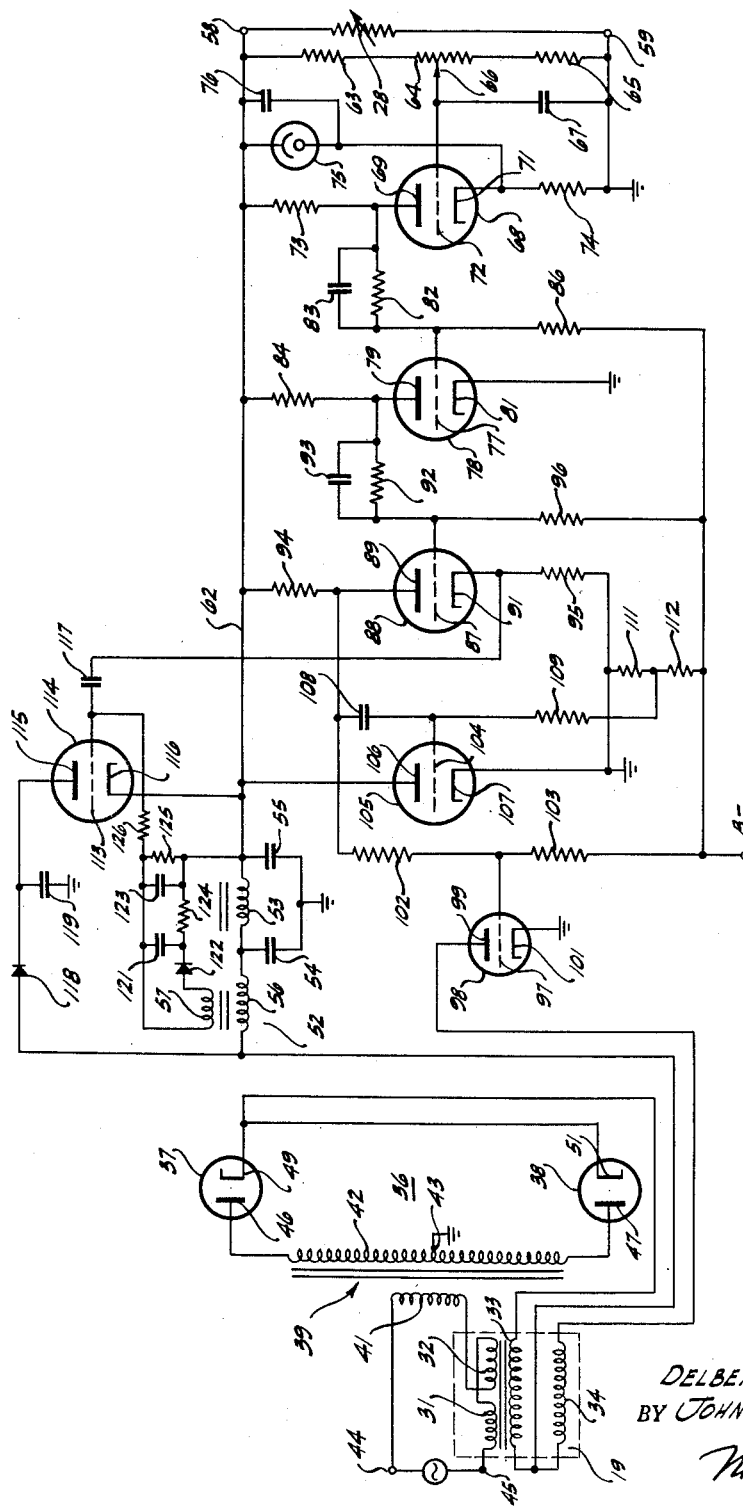
Fig. 2 is a circuit diagram of an embodiment of the voltage regulating system according to Fig. 1.

Fig. 2 illustrates schematically in greater details, a preferred embodiment of the voltage regulating system illustrated in Fig. 1. Referring now to Fig. 2, this system includes a saturable-core device, such as a magnetic amplifier, indicated by dotted rectangle 19, and having a pair of alternating-current (A. C.) windings 31 and 32, a feed-back winding 33, and a control winding 34. There is also provided a conventional full-wave rectifier circuit 36, including a pair of rectifier tubes or diodes 37 and 38, having anodes 46, 47 and cathodes 49, 51, respectively. Also included in rectifier circuit 36 is a transformer 39, having a primary winding 41 and a secondary winding 42 with a center tap 43. Alternating current is supplied to primary winding 41 from input terminals 44 and 45. Since terminal 44 is directly connected to one end of primary winding 41, and windings 31 and 32 of magnetic amplifier 19 are connected in series between terminal 45 and the other end of primary winding 41. Secondary winding 42 is connected between anodes 46 and 47 of diodes 37 and 38, respectively, while center tap 43 is returned to a common junction point or ground. Cathodes 49 and 51 of diodes 37 and 38, respectively, are connected to each other and to one end of feedback windings 33 of magnetic amplifier 19.

The output voltage developed by rectifier circuit 36, appears across the other end of feedback winding 33 and ground and is impressed on a conventional filter network including chokes 52, 53 and capacitors 54, 55 which connect the terminals of choke 53 to ground. Choke 52 is provided with primary and secondary windings 56 and 57, respectively, primary winding 56 and choke 53 being connected in series between the output end of feedback winding 33 and an output lead 62. The filtered output voltage appears across a pair of output terminals 58 and 59, terminal 59 being grounded and terminal 58 terminating output lead 62. A load, such as variable resistor 28, connects terminals 58 and 59.

Resistors 63, 64 and 65 are connected in series between output lead 62 and ground, to form a voltage divider, resistor 64 having an adjustable tap 66. Tap 66 is grounded through a capacitor 67 and is directly connected to a grid 72 of an electron discharge device such as a triode 68, having an anode 69 and a cathode 71. Triode 68 is adapted to provide an anode voltage representative of the actual value of the primary source output voltage. To this end, a glow discharge device 75, of the voltage regulating type, is connected between output lead 62 and cathode 71 as is a capacitor 76. In addition, cathode 71 is grounded through a cathode resistor 74 and anode 69 is connected to output lead 62 by an anode resistor 73.

In order to amplify the anode voltage of triode 68, there is provided an electron discharge device such as triode 78, having an anode 79, a cathode 81 and a grid 77. Anode 69 of triode 68 is connected to grid 77 by a coupling resistor 82 and a coupling capacitor 83 in parallel therewith. Anode 79 is connected to output lead 62 through an anode resistor 84, and cathode 81 is grounded. A bias potential from a source indicated at B— is impressed on grid 77 through a voltage dropping resistor 86. Anode 79 is connected to the grid 87 of an electron discharge device such as triode 88, having an anode 89 and a cathode 91, by a coupling resistor 92 and a coupling capacitor 93 in parallel therewith. Triode 88 is adapted to furnish anode and cathode voltages derived from the anode voltage of triode 78 which are directly opposed in phase. To this end, anode 89 is connected to output lead 62 by an anode resistor 94, and cathode 91 is grounded through a cathode resistor 95. The negative potential provided at B— is impressed on grid 87 through a voltage dropping resistor 96.

There is also provided an electron discharge device such as triode 98, having an anode 99, a cathode 101 and a grid 97, for regulating the current in control winding 34 of magnetic amplifier 19 according to the value of the anode voltage of triode 88. Anode 89 of triode 88 is connected to grid 97 of triode 98 through a voltage dropping resistor 102. Anode 99 is connected to the output end of feedback winding 33 through control winding 34, and cathode 101 is grounded. The negative potential at B— is impressed on control grid 97 through a voltage dropping resistor 103.

Electronic type voltage regulation is provided by means of a pair of electron discharge devices 105 and 114 having anodes 106 and 115, cathodes 107 and 116, and grids 104 and 113, respectively. Thus, anode 89 of triode 88 is coupled to grid 104 of triode 105 by a coupling capacitor 108, and the anode circiut of triode 105 is connected directly between output lead 62 and ground. Grid 104 is supplied with a bias potential from B— through series connected resistors 109 and 112. These resistors are grounded by another resistor 111. Cathode 91 of triode 88 is coupled to grid 113 of triode 114 by a coupling capacitor 116. Cathode 116 of triode 114 is connected to output lead 62, and anode 115 of triode 114 is maintained at a substantially greater potential than that of cathode 116, by a rectifier circuit comprising rectifier 118 and capacitor 119 which derives the peak voltage developed by rectifier circuit 36. Rectifier 118 and capacitor 119 are connected in series between the output end of feed-back winding 33 and ground, the ungrounded side of capacitor 119 being connected to anode 115. A bias potential for grid 113 is derived from the secondary winding 57 of choke 52 and a rectifier 122 in series therewith.

Capacitors 121, and 123, and a resistor 125 are connected in parallel between one end of secondary winding 57 and rectifier 122. Finally, resistor 124 is connected between capacitors 121 and 123, and a resistor 126 is connected between grid 113 and the junction of capacitors 121 and 123.

In operation, rectifier circuit 36 develops a D. C. output voltage between terminal 58 and ground which may deviate from a predetermined or nominal value due to changes in the resistance of load 28, for example. Therefore, a portion of the output voltage is provided between adjustable tap 66 and ground, and impressed on the control circuit of triode 68. Owing to the fact that glow discharge device 75 maintains a constant voltage between the anode 69 and the cathode 71 of triode 68, an error voltage faithfully representing the actual voltage is caused to appear between the anode 69 and ground.

This error voltage is impressed on the grid circuit of triode 78 which operates as a direct-current amplifier. The amplified error voltage is derived from the anode circuit of triode 78 and is impressed on the grid circuit of triode 88. Triode 88 operates as a conventional phase inverter so that variations in the value of the error voltage impressed on its grid circuit cause equal but opposite variations in the anode and cathode voltages. For example, if the value of the output voltage across terminals 58 and 59 increases by a certain amount, the voltage between cathode 71 of triode 68 and ground increases by the same amount, while the voltage between grid 72 and ground increases by a fraction of this amount determined acording to the relative values of resistors 63, 64 and 65. Therefore, the grid to cathode voltage of triode 68 decreases and its anode voltage increases, causing the anode voltage of triode 88 to increase and the cathode voltage of triode 88 to decrease.

The anode voltage of triode 88 is impressed on the grid circuit of triode 98, which is adapted to regulate the current flowing in the control winding 34 of magnetic amplifier 19. If as assumed before, the anode voltage of triode 88 increases, for example, due to an increase in the output voltage, the anode circuit resistance of triode 98 is decreased, allowing more current to flow through control winding 34. As in one conventional type of magnetic amplifier, including a feed-back winding, such as winding 33, this increased amount of control winding current reduces the amount of saturation caused by the alternating current impressed across the alternating current windings 31 and 32, thereby decreasing the input and output voltages of rectifier circuit 36.

However, as is well known, this reduction in the value of the input and output voltages does not occur instantaneously, since magnetic amplifier 19 responds rather slowly to such a variation in the control winding current. Therefore, triodes 105 and 114 are individually adapted to minimize increases and decreases, respectively, in the value of the output voltage during the short period of time that magnetic amplifier 19 is effectively inoperative owing to its relatively slow response. To this end, the anode voltage of triode 88 is impressed on the grid circuit of triode 105 through a differentiating network comprising capacitor 108 and resistor 109. Similarly, the cathode voltage of triode 88 is impressed on the grid circuit of triode 114 through a differentiating network comprising capacitor 117 and resistor 126. Each of these differentiating networks is so designed that the voltages impressed on the respective grid circuits of triodes 105 and 114, as a result of a variation in the output voltage, decay at approximately the rate at which magnetic amplifier 19 becomes effective to maintain the nominal output voltage.

If the output voltage increases, the voltage representative of this increase, derived from the anode circuit of triode 88 and impressed on the grid circuit of triode 105 causes the resistance of the anode circuit of triode 105, to decrease correspondingly. As a result, an increased amount of current is drawn from rectifier circuit 36 so that its output voltage is decreased. However, the voltage impressed on the grid circuit of triode 105 then decays owing to the differentiation thereof by the differentiating circuit 108, 109, and the magnetic amplifier becomes effective to maintain the nominal output voltage in the manner described. Since the grid circuit of triode 105 is biased very nearly to cut-off, its anode circuit resistance again becomes very high.

If the output voltage decreases, the voltage representative of this decrease, derived from the cathode circuit of triode 88 and impressed on the grid circuit of triode 114, causes the resistance of the anode circuit of triode 114 to decrease correspondingly. In order to effect an increase in the value of the output voltage, the anode voltage of triode 114 is derived from the unfiltered pulsating D. C. voltage developed by rectifier circuit 36. Rectifier 118 allows capacitor 119 to be unidirectionally charged so that the voltage across capacitor 119 is approximately equal to the peak voltage developed by rectifier circuit 36. Thus, a decrease in the anode circuit resistance of triode 114 allows capacitor 119 to discharge therethrough, so as to momentarily supply load 23 with an increased amount of current thereby raising the output voltage. However, as the voltage impressed on the grid circuit of triode 114 decays owing to the differentiation thereof by the differentiating circuit 117, 126, magnetic amplifier 19 becomes effective to maintain the nominal output voltage. Since the grid circuit of triode 114 is biased very nearly to cut-off, its anode circuit resistance again becomes very high.

It may be noted that the biasing potential impressed on the grid of triode 105 is derived from B—, whereas the bias potential impressed on the grid of triode 114 is derived from the secondary winding 57 of choke 52. Although this latter bias potential might be obtained from a separate voltage source also, the regulating action of triode 114 is improved by the biasing arrangement illustrated. More particularly if the A. C. input voltage to rectifier circuit 36 changes, a corresponding change will occur in the value of the anode voltage of triode 114, since this voltage is equal to the rectified peak voltage. In order to compensate for this effect so that triode 114 remains properly biased, secondary winding 57 of choke 52 in combination with rectifier 122 provides a bias potential which also varies in synchronism with the anode voltage of triode 114.

Referring now to Fig. 3, there is illustrated an improved electronic-type voltage regulating system in accordance with the present invention. Under many conditions this system is more highly efficient than conventional electronic regulators. Thus, primary source 11 is provided with output connections or leads 12 and 13, terminating in output terminals 14 and 15, respectively, across which is connected a load 28. An error sensing network is connected across output leads 14 and 15 for generating first and second error voltages representative of the value of the actual output voltage with respect to a predetermined or nominal value. The first error voltage is impressed through lead 26 on a variable impedance element 21 connected across output leads 12 and 13. The second error voltage is impressed through lead 27 on another variable impedance element 22. Finally, there is provided a secondary D. C. source having one output lead 24 connected to primary source output lead 13 by means of a common junction or ground, and another output lead 25 connected to primary source output lead 12 through variable impedance element 22.

The operation of this system is similar to that described in connection with Fig. 1. That is, each f the variable impedance elements 21 and 22 operates selectively in response to its associated error voltage, according to the sense of a deviation from the nominal output voltage. Such deviations may be caused by variations in load 28 for example. In particular, the impedance of element 21 decreases from a relatively high value when the actual output voltage across output terminals 14, 15, becomes greater than the nominal voltage. On the other hand, the impedance of variable impedance element 22, decreases from a relatively high value when the actual output voltage becomes less than the nominal voltage. As in the system of Fig. 1, impedance element 21 thereby operates to lower the actual output voltage, whereas impedance element 22 operates to raise it. However, both of these elements are effectively inoperative when the actual output voltage is equal to the nominal voltage. Accordingly, minimum power dissipation and attendant high operating efficiency is obtained.

Fig. 4 is a more detailed diagram of an embodiment of the improved electronic voltage regulating system described in connection with Fig. 3. Referring to Fig. 4, there is illustrated the primary D. C. source 11 having positive and negative output leads 12 and 13, respectively, terminating in output terminals 14, 15. The load 28 shown in block form is connected across output terminals 14 and 15. A potential, substantially lower than that of terminal 15 is provided at another terminal 31, by a voltage source indicated as B—. A resistor 32, having an adjustable tap 33 connects this terminal to output lead 12. Tap 33 is in turn connected to a direct-current amplifier 35, illustrated in block form. D. C. amplifier 35 develops a voltage representative of the primary source output voltage derived from the voltage between tap 33 and terminal 15. D. C. amplifier 35 is connected to a grid 37 of an electron discharge device or triode 38 having an anode 39 and a cathode 41. Triode 38 is adapted to provide equal but opposite anode and cathode voltages derived from the output voltage of amplifier 35. To this end, cathode 41 is grounded through a cathode resistor 42, and anode 39 is connected to output lead 12 by an anode resistor 43.

Cathode 41 is coupled to a grid 104 of an electron discharge device or triode 105, by means of a coupling capacitor 108. Consequently, the voltage across the grid circuit of triode 105 is derived from the cathode voltage of triode 38. Triode 105 also includes an anode 106 and a cathode 107 connected directly across primary source 11. Contrariwise anode 39 of triode 38 is coupled to a grid 113 of an electron discharge device or triode 114, by means of a coupling capacitor 117. Consequently, the voltage across the grid circuit of triode 105 is derived from the anode voltage of triode 38.

There is also provided a secondary D. C. source 23, illustrated in block form and having a positive output lead 25 and a negative output lead 24, for developing a voltage substantially greater than the voltage developed by primary source 11. Negative output lead 24 is grounded and positive output lead 25 is connected to positive output lead 12 of primary source 11 through the anode circuit of triode 114 comprising anode 115 and cathode 116. Thus anode 115 is connected to output lead 25, and cathode 116 is connected to output lead 12. Biasing potentials for the grids 104 and 113 of triodes 105 and 114 are applied from suitable sources of negative potential such as batteries 45 and 46, respectively, through resistors 109 and 126. Finally, a feedback network 44, illustrated in block form is connected between cathode 41 of triode 38 and adjustable tap 33.

In operation triodes 105 and 114 are biased very nearly to cut-off by batteries 45 and 46, when primary source 10 develops an output voltage of a predetermined or nominal value. However, primary source 10 may develop an output voltage which momentarily differs from the nominal value as previously explained. Accordingly, the voltage component between tap 33 and terminal 31, derived from the actual output voltage, is amplified by amplifier 35 and impressed on the control circuit of triode 38. As a result, a first error voltage is produced between the cathode of triode 38 and ground, and a second error voltage of opposite phase is produced between the anode of triode 38 and ground. The first error voltage is differentiated by a differentiating circuit comprising capacitor 108 and resistor 109, and impressed on the grid circuit of triode 105. The second error voltage is similarly differentiated by a differentiating circuit comprising capacitor 117 and resistor 126, and impressed on the grid circuit of triode 114.

If the actual output voltage is greater than the nominal voltage, a positive pulse, resulting from the differentiation of the first error voltage, is impressed on the grid circuit of triode 105, and a negative pulse, resulting from the differentiation of the second error voltage, is impressed on the grid circuit of triode 114. Consequently, the anode circuit resistance of triode 114 remains relatively high, since it is further cut-off, whereas the anode circuit resistance of triode 105 momentarily decreases according to the magnitude of the pulse. This decrease in the anode circuit resistance of triode 105 causes an increase in the amount of current drawn from the primary source 11, thereby decreasing its output voltage for the duration of the pulse.

If the actual output voltage is less than the nominal voltage, a positive pulse, resulting from the differentiation of the second error voltage, is impressed on the grid circuit of triode 114, and a negative pulse, resulting from the differentiation of the first error voltage, is impressed on the grid circuit of triode 105. Consequently, the anode circuit resistance of triode 105 remains at a relatively high value, whereas the anode circuit resistance of triode 114 decreases according to the magnitude of the pulse. A low resistance path is thereby provided by the anode circuit of triode 114 between output lead 25 of secondary source 23, and output lead 12 of primary source 11. By means of this path, an increased amount of current is supplied to load 28 from secondary source 23 thereby increasing the output voltage.

Feedback network 44 comprises a low-pass filter arranged in a degenerative loop including D. C. amplifier 35. Slow variations in the output voltage of the D. C. amplifier, are minimized by means of this feedback network. For example, if the output voltage of D. C. amplifier 35 drifts, even though the input voltage remains constant, a degenerative voltage is derived from the output voltage and applied to the input terminals through feedback network 44. However, high-frequency voltage components representative of a rapid fluctuation in the primary source output voltage, are not degenerated in this manner, because of the low-pass filtering action of the network. Since this feedback network is provided for the purpose of increasing the stability of amplifier 35 only, other means for accomplishing this purpose without affecting the remainder of the system would be equally suitable.

What is claimed as new is:

1. A voltage regulating system for maintaining an output voltage derived from a primary direct-current source at a predetermined or nominal value comprising: a secondary direct-current source for developing a voltage which exceeds the nominal output voltage, first and second variable impedance elements connected in series across said secondary source, said first variable impedance element being connected across the primary source, first and second control circuits associated individually with said first and second variable impedance elements and adapted to control the impedance thereof, and means coupled to the primary source for deriving first and second error voltages and impressing them individually on said first and second control circuits; said first error voltage energizing said first control circuit in response to increases in the value of the output voltage to decrease the impedance of said first variable impedance element, thereby to lower the output voltage, and said second error voltage energizing said second control circuit in response to decreases in the value of the output voltage to decrease the impedance of said second variable impedance element, thereby to raise the output voltage.

2. A voltage regulating system for maintaining an output voltage derived from a primary direct-current source at a predetermined or nominal value comprising: a secondary direct-current source for developing a voltage which exceeds the nominal output voltage, first and second electron discharge devices, each having an anode circuit, and a control circuit adapted to control the anode circuit resistance, said anode circuits being connected in series across said secondary source, and said first anode circuit being connected across the primary source, an error sensing network coupled to the primary source, and first and second output circuits associated with said error sensing network and individually coupled to said first and second control circuits for deriving individually a pair of error voltages representative of the actual value of the output voltage, one of said error voltages energizing said first control circuit in accordance with increases in the value of the output voltage to decrease the resistance of said first anode circuit, thereby to lower the output voltage, and the other one of said error voltages energizing said second control circuit in accordance with decreases in the value of the output voltage to decrease the resistance of said second anode circuit, thereby to raise the output voltage.

3. A voltage regulating system according to claim 2 including first and second differentiating networks, said first differentiating network being connected between said first control circuit and said first output circuit, and said second differentiating network being connected between said second control circuit and said second output circuit so that each of said control circuits is energized only in response to a change in the value of the output voltage.

4. A voltage regulating system for maintaining an output voltage derived from a primary direct-current source at a predetermined or nominal value comprising: a secondary direct-current source for developing a voltage which exceeds the nominal output voltage, first and second electron discharge devices, etach having an anode circuit, and a control circuit adapted to control the anode circuit resistance, said anode circuits being connected in series across said secondary source, and said first anode circuit being connected across the primary source, an error sensing network coupled to the primary source, for deriving an error voltage representative of the value of the output voltage, a phase inverter coupled to said error sensing network, and first and second output circuits associated with said phase inverter and individually coupled to said first and second control circuits for impressing said error voltage on said first and second control circuits in opposite phase relation, one of said voltages energizing said first control circuit in accordance with increases in the value of the output voltage to decrease the resistance of said first anode circuit, thereby to lower the output voltage, and the other one of said error voltages energizing said second control circuit in accordance with decreases in the value of the output voltage to decrease the resistance of said second anode circuit, thereby to raise the output voltage.

5. A voltage regulating system according to claim 4, including first and second differentiating networks, said first differentiating network being connected between said first control circuit and said first output circuit, and said second differentiating network being connected between said second control circuit and said second output circuit so that each of said control circuits is energized only in response to a change in the value of the output voltage.

6. A voltage regulating system according to claim 5, including a direct-current amplifier coupled between the output circuit of said error sensing network and said phase inverter for amplifying said error voltage.

7. A voltage regulating system according to claim 6, including a low-pass degenerative feedback network connected between said error sensing network and said phase inverter, thereby to minimize drift in said direct-current amplifier without substantially reducing the amplification of high-frequency components of said error voltage.

8. A voltage regulating system for maintaining the output voltage of a primary direct-current source at a predetermined or nominal value comprising: a high-efficiency voltage regulator effective to counteract slow variations of the output voltage, a secondary direct-current source for developing a voltage which exceeds the nominal output voltage, first and second variable impedance circuits connected in series across said secondary source, said first impedance circuit being connected across the primary source, first and second control circuits for individually decreasing the impedance of said first and second variable impedance circuits, first and second differentiating networks connected to said first and second control circuits respectively, and means coupled to the primary source for deriving first and second error voltages and impressing said error voltages individually on said first and second differentiating networks, said first error voltages momentarily energizing said first control circuit in response to rapid increases in the value of the output voltage to decrease the impedance of said first variable impedance circuit, thereby to lower the output voltage, and said second error voltage momentarily energizing said second control circuit in response to rapid decreases in the value of the output voltage to decrease the impedance of said second variable impedance circuit, thereby to raise the output voltage.

9. A voltage regulating system for maintaining the output voltage of a primary direct-current source at a predetermined or nominal value comprising: a high efficiency voltage regulator effective to counteract slow variations of the output voltage, a secondary direct-current source for developing a voltage which exceeds the nominal output voltage, first and second electron discharge devices, each having an anode circuit and a control circuit, said anode circuits being connected in series across said secondary source, and said first anode circuit being connected across the primary source, first and second differentiating circuits connected to said first and second control circuits respectively, an error sensing network coupled to the primary source for deriving an error voltage representative of the value of the output voltage, and first and second output circuits associated with said error sensing network and coupled to said first and second differentiating circuits respectively, for impressing said error voltage on said first and second control circuits, thereby to momentarily decrease the resistance of one of said anode circuits according to the sense of a deviation from the nominal output voltage, a decrease in the resistance of said first anode circuit being effective to lower the output voltage and a decrease in the resistance of said second anode circuit being effective to raise the output voltage.

10. A voltage regulating system for maintaining the output voltage of a primary direct-current source at a predetermined or nominal value comprising: a high-efficiency voltage regulator effective to counteract slow variations of the output voltage, a secondary direct-current source for developing a voltage which exceeds the nominal output voltage, first and second electron discharge devices, each having an anode circuit and a control circuit, said anode circuits being connected in series across said secondary source, and said first anode circuit being connected across the primary source, first and second differentiating circuits connected to said first and second control circuits respectively, an error sensing network coupled to the primary source for deriving an error voltage representative of the value of the output voltage, a phase inverter coupled to said error sensing network, and first and second output circuits associated with said phase inverter and coupled to said first and second differentiating circuits for impressing said error voltage on said first and second differentiating circuits in opposite phase relation, thereby to decrease momentarily the resistance of one of said anode circuits according to the sense of a deviation from the nominal output voltage, a decrease in the resistance of said first anode circuit being effective to lower the output voltage and a decrease in the resistance of said second anode circuit being effective to raise the output voltage.

11. A voltage regulating system for maintaining the output voltage of a primary direct-current source at a predetermined or nominal value comprising: a saturable-core device effective to counteract slow variations of the output voltage, a secondary direct-current source for developing a voltage which exceeds the nominal output voltage, first and second electron discharge devices, each having an anode circuit, and a control circuit, said anode circuits being connected in series across said secondary source, and said first anode circuit being connected across the primary source, first and second differentiating circuits connected to said first and second control circuits, respectively, an error sensing network coupled to the primary source for deriving an error voltage representative of the value of the output voltage, a phase inverter coupled to said error sensing network, and first and second output circuits associated with said phase inverter and coupled to said first and second differentiating circuits for impressing said error voltage on said first and second differentiating circuits in opposite phase relation, thereby to momentarily decrease the resistance of one of said anode circuits according to the sense of a deviation from the nominal output voltage, a decrease in the resistance of said first anode circuit being effective to lower the output voltage and a decrease in the resistance of said second anode circuit being effective to raise the output voltage.

12. A voltage regulating system for maintaining the output voltage of an alternating-current rectifier circuit at a predetermined or nominal value comprising: first and second electron discharge devices, each having an anode circuit and a control circuit, said anode circuits being connected in series and said first anode circuit being connected across the rectifier circuit, circuit means associated with the the rectifier circuit for deriving therefrom a direct-current voltage which exceeds the nominal output voltage, said direct-current voltage being applied across the series combination of said anode circuits, first and second differentiating circuits connected to said first and second control circuits respectively, an error sensing network coupled to the rectifier circuit for deriving an error voltage representative of the value of the output voltage, a phase inverter coupled to said error sensing network, and first and second output circuits associated with said phase inverter coupled to said first and second differentiating circuits for impressing said error voltage on said first and second differentiating circuits in opposite phase relation, thereby to decrease selectively and momentarily the resistance of one of said anode circuits according to the sense of a deviation from the nominal output voltage, a decrease in the resistance of said first anode circuit being effective to counteract momentarily increases in the output voltage and a decrease in the resistance of said second anode circuit being effective to counteract momentarily decreases in the output voltage and a saturable-core device coupled to said error sensing network and responsive to the error voltage developed thereby for controlling the amount of alternating current supplied to said alternating current rectifier circuit thereby to counteract continuously increases and decreases in the output voltage.

13. A voltage regulated power supply comprising: a full wave alternating-current rectifier circuit, first and second electron discharge devices each having an anode circuit and a control circuit, said anode circuits being connected in series and said first anode circuit being connected across said alternating-current rectifier circuit, a peak rectifier circuit coupled to said rectifier circuit for deriving the rectified peak voltage developed thereby, said peak voltage being applied across the series combination of said anode circuits, first and second differentiating circuits connected to said first and second control circuits respectively, an error sensing circuit coupled to said rectifier circuit for deriving an error voltage representative of the value of the voltage developed by said rectifier circuit, a direct-current amplifier coupled to said error sensing circuit, a phase inverter coupled to said direct current amplifier and provided with first and second output circuits, the respective output circuits of said phase inverter being coupled to said first and second differentiating circuits, thereby to decrease selectively and momentarily the resistance of one of said anode circuits according to the sense of a deviation from the nominal output voltage, a decrease in the resistance of said first anode circuit being effective to counteract momentarily increases in the output voltage, and a decrease in the resistance of said second anode circuit being effective to counteract momentarily decreases in the output voltage, and a saturable-core device coupled to said error sensing network and responsive to the error voltage developed thereby for controlling the amount of alternating current supplied to said alternating current rectifier circuit thereby to counteract continuously increases and decreases in the output voltage.

References Cited in the file of this patent
UNITED STATES PATENTS

| | | |
|---|---|---|
| 2,511,850 | Hoag | June 20, 1950 |
| 2,593,066 | Singer | Apr. 15, 1952 |
| 2,640,959 | Brown | June 2, 1953 |
| 2,644,128 | Henrich | June 20, 1953 |